(12) United States Patent  
Fujimura et al.

(10) Patent No.: US 11,705,563 B2  
(45) Date of Patent: Jul. 18, 2023

(54) FUEL CELL SYSTEM

(71) Applicants: TOYOTA JIDOSHA KABUSHIKI KAISHA, Toyota (JP); Aisan Kogyo Kabushiki Kaisha, Obu (JP)

(72) Inventors: Yoshikatsu Fujimura, Toyota (JP); Shinobu Otsuka, Kariya (JP); Jiro Oikawa, Tokai (JP)

(73) Assignees: TOYOTA JIDOSHA KABUSHIKI KAISHA, Toyota (JP); AISAN KOGYO KABUSHIKI KAISHA, Obu (JP)

( * ) Notice: Subject to any disclaimer, the term of this patent is extended or adjusted under 35 U.S.C. 154(b) by 17 days.

(21) Appl. No.: 17/492,849

(22) Filed: Oct. 4, 2021

(65) Prior Publication Data

US 2022/0109171 A1 Apr. 7, 2022

(30) Foreign Application Priority Data

Oct. 7, 2020 (JP) ................................ 2020-169679

(51) Int. Cl.
| | |
|---|---|
| *H01M 8/04664* | (2016.01) |
| *H01M 8/04746* | (2016.01) |
| *H01M 8/04089* | (2016.01) |
| *H01M 8/04694* | (2016.01) |

(52) U.S. Cl.  
CPC ... *H01M 8/04664* (2013.01); *H01M 8/04089* (2013.01); *H01M 8/04746* (2013.01); *H01M 8/04694* (2013.01)

(58) Field of Classification Search  
CPC ......... H01M 8/04664; H01M 8/04089; H01M 8/04746; H01M 8/04; H01M 8/04082; H01M 8/04104; H01M 8/04671; H01M 8/04679; H01M 8/04686; H01M 8/04694; H01M 8/04753; H01M 8/04761;  
(Continued)

(56) References Cited

U.S. PATENT DOCUMENTS

2010/0266920 A1   10/2010   Kanie et al.  
2019/0280314 A1*   9/2019   Katayama ......... H01M 8/04626

FOREIGN PATENT DOCUMENTS

| JP | 2008060054 | * | 3/2008 |
|---|---|---|---|
| JP | 2009026632 | * | 2/2009 |

(Continued)

*Primary Examiner* — Matthew W Van Oudenaren  
(74) *Attorney, Agent, or Firm* — Dickinson Wright, PLLC (57) ABSTRACT

A fuel cell system includes a control unit that detects an abnormality of a flow dividing valve provided in a bypass channel for an oxidation gas by using a detected opening degree detected by a valve opening degree detection sensor that detects the opening degree of the flow dividing valve. When the detected abnormality is an opening abnormality that is failure to open and the flow dividing valve can close, the control unit sends a closing command for making the opening degree smaller than a current opening degree to a valve driving motor. Either when the detected abnormality is a closing abnormality that is failure to close and the flow dividing valve can open or when the detected abnormality is an opening-closing abnormality that is failure both to close and to open, the control unit sends a maintaining command for maintaining the opening degree to the valve driving motor.

8 Claims, 3 Drawing Sheets

(58) Field of Classification Search
CPC ......... H01M 8/04776; H01M 8/04783; H01M 8/04395; H01M 8/0441; H01M 8/04425
See application file for complete search history.

(56) References Cited

FOREIGN PATENT DOCUMENTS

| | | |
|---|---|---|
| JP | 2009026632 A | 2/2009 |
| JP | 2009158209 A | 7/2009 |

\* cited by examiner

FUEL CELL SYSTEM

CROSS-REFERENCE TO RELATED APPLICATION

This application claims priority to Japanese Patent Application No. 2020-169679 filed on Oct. 7, 2020, incorporated herein by reference in its entirety.

BACKGROUND

1. Technical Field

This disclosure relates to a fuel cell system.

2. Description of Related Art

There are known fuel cell systems provided with a bypass channel that connects an oxidation gas supply channel for supplying an oxidation gas to a fuel cell and an oxidation off-gas discharge channel for discharging an oxidation off-gas from the fuel cell to each other. The gas channels in such fuel cell systems are sometimes provided with a valve for adjusting the gas flow rate. Japanese Unexamined Patent Application Publication No. 2009-26632 (JP 2009-26632 A) discloses a fuel cell system in which the flow rate of an oxidation gas supplied to a fuel cell is adjusted by means of a bypass valve provided in a bypass channel.

SUMMARY

In a system using a bypass valve as described above, abnormalities of the bypass valve can occur. In the fuel cell system of JP 2009-26632 A, the bypass valve is controlled in the same manner as at normal times despite the bypass valve having an abnormality. This can lead to a problem, for example, that a command for increasing the opening degree is sent despite the bypass valve having an abnormality of failure to open and that consequently an excessive load is placed on a valve driving motor that adjusts the opening degree of the bypass valve. Further, when the valve provided in the oxidation gas supply channel or the oxidation off-gas discharge channel has developed an abnormality of failure to open and, in response, current application to the valve driving motor is stopped, this can lead to a problem that that valve, if of normally closed type, fully closes, making it impossible to continue power generation due to lack of the oxidation gas or failure to discharge the oxidation off-gas. In view of these situations, a technology is desired that allows a fuel cell to continue power generation in the event of an abnormality of a valve used for the fuel cell while keeping the load on a valve driving motor down.

This disclosure can be realized in the following forms.

(1) A first aspect of this disclosure relates to a fuel cell system including: a fuel cell; an oxidation gas supply channel through which an oxidation gas is supplied to the fuel cell; an oxidation off-gas discharge channel through which an oxidation off-gas is discharged from the fuel cell; a bypass channel that connects the oxidation gas supply channel and the oxidation off-gas discharge channel to each other; a flow dividing valve that is provided in the bypass channel to divide a flow of the oxidation gas flowing through the oxidation gas supply channel into a flow toward the fuel cell and a flow toward the bypass channel; a valve driving motor that adjusts the opening degree of the flow dividing valve; a valve opening degree detection sensor that detects the opening degree of the flow dividing valve; and a control unit configured to control the operation of the flow dividing valve by controlling the valve driving motor, and to detect an abnormality of the flow dividing valve using a detected opening degree that is the opening degree of the flow dividing valve detected by the valve opening degree detection sensor. The control unit is configured such that: when the detected abnormality is an opening abnormality that is failure to open and the flow dividing valve is able to close, the control unit sends a closing command for making the opening degree smaller than a current opening degree to the valve driving motor; and either when the detected abnormality is a closing abnormality that is failure to close and the flow dividing valve is able to open or when the detected abnormality is an opening-closing abnormality that is failure both to close and to open, the control unit sends a maintaining command for maintaining the opening degree to the valve driving motor.

In the fuel cell system of the first aspect, when the detected abnormality is the opening abnormality that is failure to open and the flow dividing valve can close, the control unit sends the closing command for making the opening degree smaller than the current opening degree to the valve driving motor. Thus, the oxidation gas flowing toward the bypass channel can be reduced while the flow rate of the oxidation gas flowing toward the fuel cell can be increased to allow the fuel cell to continue power generation. Further, the load on the valve driving motor can be kept from increasing as a result of a command to open being sent to the valve driving motor despite the opening abnormality. When the abnormality of the flow dividing valve is the closing abnormality that is failure to close and the flow dividing valve can open, the control unit sends the maintaining command for maintaining the opening degree to the valve driving motor. Thus, the flow rate of the oxidation gas flowing toward the fuel cell can be kept from decreasing to allow the fuel cell to continue power generation. Further, the load on the valve driving motor can be kept from increasing as a result of a command to close being sent to the valve driving motor despite the closing abnormality. When the abnormality of the flow dividing valve is the opening-closing abnormality that is failure both to close and to open, the control unit sends the maintaining command for maintaining the opening degree to the valve driving motor. Thus, the flow rate of the oxidation gas flowing toward the fuel cell can be kept from decreasing to allow the fuel cell to continue power generation. Further, the load on the valve driving motor can be kept from increasing as a result of a command to close or a command to open being sent to the valve driving motor despite the opening-closing abnormality. In this way, the fuel cell system of this form allows the fuel cell to continue power generation in the event of an abnormality of the flow dividing valve while keeping the load on the valve driving motor down.

(2) In the fuel cell system of the first aspect, the control unit may be configured to control the valve driving motor by sending an opening degree signal to the valve driving motor, and to detect the abnormality when an opening degree difference between an opening degree indicated by the sent opening degree signal and the detected opening degree is not smaller than a predetermined opening degree difference. The fuel cell system of this form can accurately detect an abnormality using the opening degree indicated by the opening degree signal and the detected opening degree.

(3) In the fuel cell system of form (2), the control unit may be configured to, upon detecting the abnormality, send a predetermined opening degree signal to the valve driving motor to determine which of the opening abnormality and the closing abnormality that abnormality is. Upon detecting an abnormality, the fuel cell system of this form can accurately determine which of the opening abnormality and the closing abnormality that abnormality is.

(4) In the fuel cell systems of forms (1) to (3), the control unit may be configured such that, when the detected abnormality is the opening abnormality and the flow dividing valve is able to close, the control unit sends, as the closing command, a command for adjusting the opening degree to a minimum opening degree to the valve driving motor. In the fuel cell system of this form, when the abnormality of the flow dividing valve is the opening abnormality and the flow dividing valve can close, the command for adjusting the opening degree to the minimum opening degree is sent as the closing command to the valve driving motor, so that a decrease in the flow rate of the oxidation gas flowing toward the fuel cell can be minimized. As a result, the fuel cell is further facilitated to continue power generation.

(5) A second aspect of this disclosure relates to a fuel cell system including: a fuel cell; an oxidation gas supply channel through which an oxidation gas is supplied to the fuel cell; an oxidation off-gas discharge channel through which an oxidation off-gas is discharged from the fuel cell; a flow control valve that is at least one of a valve that is disposed in the oxidation gas supply channel and adjusts a flow of the oxidation gas and a valve that is disposed in the oxidation off-gas discharge channel and adjusts a flow of the oxidation off-gas; a valve driving motor that adjusts the opening degree of the flow control valve; a valve opening degree detection sensor that detects the opening degree of the flow control valve; and a control unit configured to control the operation of the flow control valve by controlling the valve driving motor, and to detect an abnormality of the flow control valve using a detected opening degree that is the opening degree of the flow control valve detected by the valve opening degree detection sensor. The control unit is configured such that: when the detected abnormality is a closing abnormality that is failure to close and the flow control valve is able to open, the control unit sends an opening command for making the opening degree larger than a current opening degree to the valve driving motor; and either when the detected abnormality is an opening abnormality that is failure to open and the flow control valve is able to close or when the detected abnormality is an opening-closing abnormality that is failure both to open and to close, the control unit sends a maintaining command for maintaining the opening degree to the valve driving motor.

In the fuel cell system of the second aspect, when the detected abnormality is the closing abnormality that is failure to close and the flow control valve can open, the control unit sends the opening command for making the opening degree larger than the current opening degree to the valve driving motor. Thus, the flow rate of the oxidation gas flowing toward the fuel cell can be increased to allow the fuel cell to continue power generation. Further, the load on the valve driving motor can be kept from increasing as a result of a command to close being sent to the valve driving motor despite the closing abnormality. When the detected abnormality is the opening abnormality and the flow control valve can close, the control unit sends the maintaining command for maintaining the opening degree to the valve driving motor. Thus, the flow rate of the oxidation gas flowing toward the fuel cell can be kept from decreasing to allow the fuel cell to continue power generation. Further, the load on the valve driving motor can be kept from increasing as a result of a command to open being sent to the valve driving motor despite the opening abnormality. When the detected abnormality is the opening-closing abnormality, the control unit sends the maintaining command for maintaining the opening degree to the valve driving motor. Thus, the flow rate of the oxidation gas flowing toward the fuel cell can be kept from decreasing to allow the fuel cell to continue power generation. Further, the load on the valve driving motor can be kept from increasing as a result of a command to close or a command to open being sent to the valve driving motor despite the opening-closing abnormality. In this way, the fuel cell system of this form allows the fuel cell to continue power generation in the event of an abnormality of the flow control valve while keeping the load on the valve driving motor down.

(6) In the fuel cell system of the second aspect, the control unit may be configured to control the valve driving motor by sending an opening degree signal to the valve driving motor, and to detect the abnormality when an opening degree difference between an opening degree indicated by the sent opening degree signal and the detected opening degree is not smaller than a predetermined opening degree difference. The fuel cell system of this form can accurately detect an abnormality using the opening degree indicated by the opening degree signal and the detected opening degree.

(7) In the fuel cell system of form (6), the control unit may be configured to, upon detecting the abnormality, send a predetermined opening degree signal to the valve driving motor to determine which of the opening abnormality and the closing abnormality that abnormality is. Upon detecting an abnormality, the fuel cell system of this form can accurately determine which of the opening abnormality and the closing abnormality that abnormality is.

(8) In the fuel cell systems of forms (5) to (7), the control unit may be configured such that, when the detected abnormality is the closing abnormality and the flow control valve is able to open, the control unit sends, as the opening command, a command for adjusting the opening degree to a maximum opening degree to the valve driving motor. In the fuel cell system of this form, when the abnormality of the flow control valve is the closing abnormality and the flow control valve can open, the command for adjusting the opening degree to the maximum opening degree is sent as the opening command to the valve driving motor. Thus, the opening degree is adjusted such that the amount of oxidation gas flowing toward the fuel cell or the amount of oxidation off-gas discharged from the fuel cell increases. As a result, the fuel cell is further facilitated to continue power generation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. Embodiment

A-1. Configuration of Fuel Cell System

Figure 1:
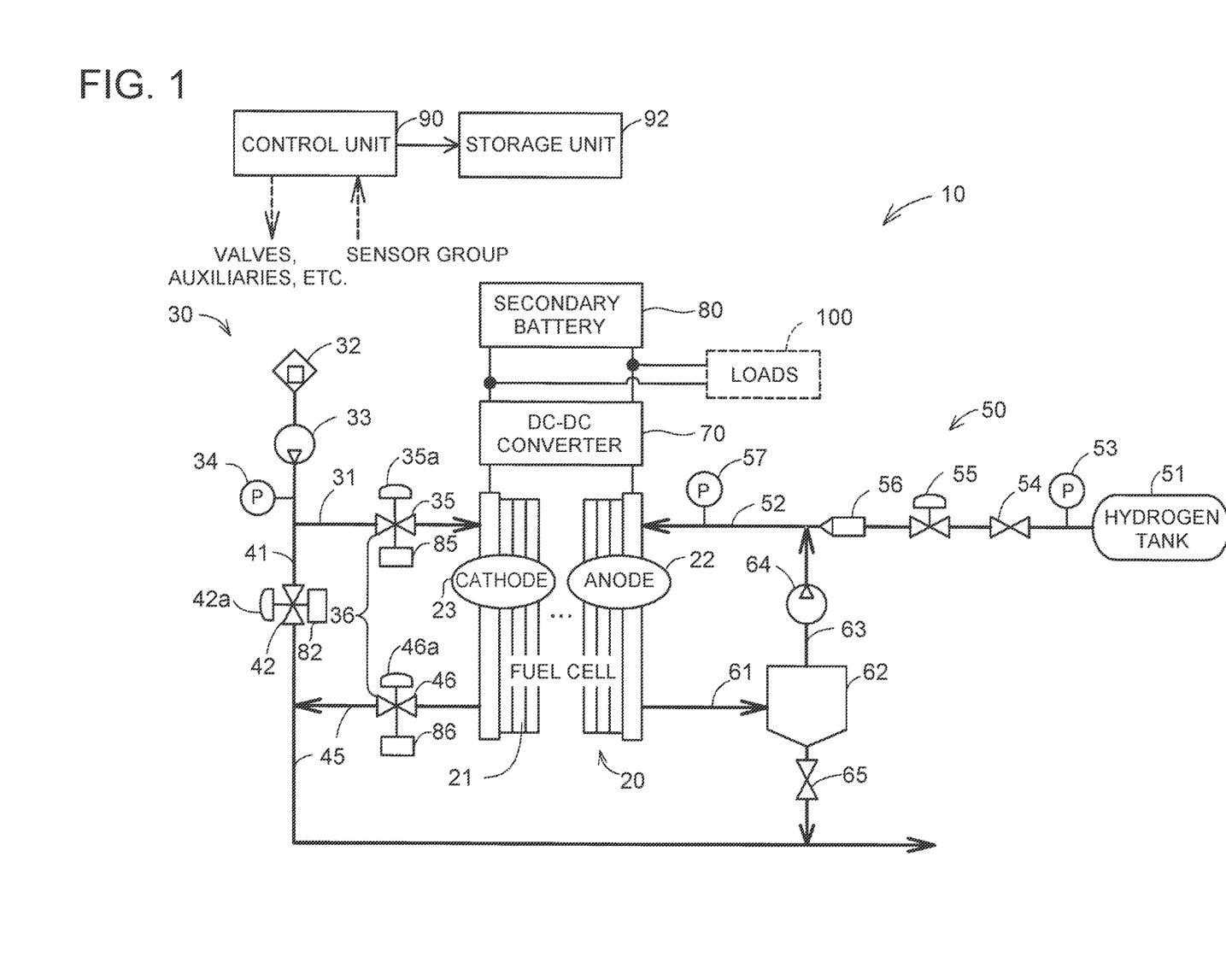
FIG. 1 is an illustration showing the general configuration of a fuel cell system as one embodiment of the present disclosure.

FIG. 1 is an illustration showing the general configuration of a fuel cell system 10 as one embodiment of the present disclosure. The fuel cell system 10 is installed in a fuel cell vehicle (not shown) and supplies electricity to loads 100 including a driving motor of the vehicle.

The fuel cell system 10 includes a fuel cell 20, an oxidation gas supply and discharge system 30, a hydrogen gas supply and discharge system 50, a DC-DC converter 70, a secondary battery 80, valve opening degree detection sensors 82, 85, 86, a control unit 90, and a storage unit 92. The fuel cell system 10 may further include a refrigerant circulation system (not shown) that cools the fuel cell 20 to keep the temperature of the fuel cell 20 within a predetermined range.

The fuel cell 20 is formed by a polymer electrolyte fuel cell and generates electricity by being supplied with a hydrogen gas and an oxidation gas. The fuel cell 20 has a stack structure in which a plurality of single cells 21 is stacked. Each single cell 21 has a membrane-electrode assembly (not shown) that is composed of an electrolyte membrane (not shown) and electrodes disposed on both sides thereof, and a pair of separators (not shown) that sandwiches this membrane-electrode assembly. In each single cell 21 constituting a part of the fuel cell 20, an anode 22 to be supplied with the hydrogen gas and a cathode 23 to be supplied with the oxidation gas are formed with the electrolyte membrane interposed therebetween. In FIG. 1, the anode 22 and the cathode 23 are conceptually represented.

The oxidation gas supply and discharge system 30 supplies the oxidation gas to the fuel cell 20 and discharges an oxidation off-gas. The oxidation gas supply and discharge system 30 has an oxidation gas supply channel 31, an air flowmeter 32, a compressor 33, a cathode pressure sensor 34, flow control valves 36, a bypass channel 41, a flow dividing valve 42, and an oxidation off-gas discharge channel 45.

The oxidation gas supply channel 31 constitutes a channel for the oxidation gas to be supplied to the fuel cell 20. The air flowmeter 32 detects the flow rate of the oxidation gas taken into the oxidation gas supply channel 31. The compressor 33 compresses the oxidation gas and pumps it to the fuel cell 20. The cathode pressure sensor 34 is disposed in the oxidation gas supply channel 31, on the side of the fuel cell 20 relative to the compressor 33, and detects the pressure of the oxidation gas supplied to the fuel cell 20.

The flow control valves 36 include an inlet valve 35 and a cathode pressure control valve 46. The inlet valve 35 is disposed in the oxidation gas supply channel 31. The inlet valve 35 is disposed between the compressor 33 and the fuel cell 20, on the side of the fuel cell 20 relative to a point of connection to the bypass channel 41. A valve driving motor 35a adjusts the opening degree of the inlet valve 35 in accordance with a command received from the control unit 90. As a result, the flow rate of the oxidation gas flowing through the oxidation gas supply channel 31 is adjusted.

The cathode pressure control valve 46 is disposed in the oxidation off-gas discharge channel 45. The cathode pressure control valve 46 is disposed between the fuel cell 20 and a junction between the oxidation off-gas discharge channel 45 and the bypass channel 41. A valve driving motor 46a adjusts the opening degree of the cathode pressure control valve 46 in accordance with a command received from the control unit 90. As a result, the flow rate of the oxidation off-gas flowing through the oxidation off-gas discharge channel 45 is adjusted.

The bypass channel 41 connects the oxidation gas supply channel 31 and the oxidation off-gas discharge channel 45 to each other. The flow dividing valve 42 is disposed in the bypass channel 41 and divides the flow of the oxidation gas into a flow toward the fuel cell 20 and a flow toward the bypass channel 41. A valve driving motor 42a adjusts the opening degree of the flow dividing valve 42 in accordance with a command from the control unit 90. As a result, the flow rate of the oxidation gas flowing through the bypass channel 41 is adjusted. The oxidation off-gas discharge channel 45 discharges the oxidation off-gas discharged from the fuel cell 20 to an outside of the fuel cell system 10. In this embodiment, the inlet valve 35, the flow dividing valve 42, and the cathode pressure control valve 46 are all configured to be normally closed. Each of a valve element of the inlet valve 35 and a valve element of the cathode pressure control valve 46 is larger than a valve element of the flow dividing valve 42. The inlet valve 35 and the cathode pressure control valve 46 have a sealing compound applied between their valve element and valve body to enhance the sealing property.

The hydrogen gas supply and discharge system 50 supplies the hydrogen gas to the fuel cell 20 and discharges a hydrogen off-gas. The hydrogen gas supply and discharge system 50 includes a hydrogen tank 51, a hydrogen gas supply channel 52, a tank pressure sensor 53, a main stop valve 54, an anode pressure control valve 55, an injector 56, an anode pressure sensor 57, a hydrogen gas discharge channel 61, a gas-liquid separator 62, a circulation pipe 63, a hydrogen pump 64, and a vent and drain valve 65.

The hydrogen tank 51 stores high-pressure hydrogen. The hydrogen gas supply channel 52 constitutes a channel for hydrogen supplied from the hydrogen tank 51 to the fuel cell 20. The tank pressure sensor 53 detects the pressure of the hydrogen tank 51. The main stop valve 54, the anode pressure control valve 55, the injector 56, and the anode pressure sensor 57 are disposed in the hydrogen gas supply channel 52, in this order from the side closer to the hydrogen tank 51, and driven by the control unit 90.

The main stop valve 54 turns on and off the supply of hydrogen from the hydrogen tank 51. The anode pressure control valve 55 adjusts the pressure of the hydrogen supplied to the fuel cell 20. The injector 56 is formed by an electromagnetically driven on-off valve, and injects hydrogen by being driven in accordance with a driving cycle and a valve opening time set by the control unit 90. The anode pressure sensor 57 is disposed in the hydrogen gas supply channel 52, closer to the fuel cell 20 than a point of connection to the circulation pipe 63 is, and detects the pressure of the anode 22.

The hydrogen gas discharge channel 61 connects the fuel cell 20 and the gas-liquid separator 62 to each other. The gas-liquid separator 62 separates liquid water from an anode exhaust gas that has been discharged from the fuel cell 20 and contains liquid water. The circulation pipe 63 connects the gas-liquid separator 62 to a portion of the hydrogen gas supply channel 52 on the side of the fuel cell 20 relative to the injector 56. The hydrogen pump 64 is disposed in the circulation pipe 63 and circulates the anode exhaust gas containing a hydrogen gas that has not been used in an electrochemical reaction back to the hydrogen gas supply channel 52. The vent and drain valve 65 is normally closed and opens in accordance with an order from the control unit

90. Thus, the liquid water and an impurity gas separated by the gas-liquid separator 62 are discharged to the outside of the fuel cell system 10.

The DC-DC converter 70 is disposed between the fuel cell 20 on one side and the secondary battery 80 and the loads 100 on the other side. The DC-DC converter 70 converts the output voltage of the fuel cell 20 to a desired voltage.

The secondary battery 80 is a chargeable and dischargeable battery and formed by a lithium-ion battery. Instead of a lithium-ion battery, the secondary battery 80 may be formed by an arbitrary secondary battery, such as a nickel-metal hydride battery. The secondary battery 80 functions as a power source for the fuel cell system 10 along with the fuel cell 20, as well as stores electricity generated by the fuel cell 20.

The valve opening degree detection sensor 82 is provided near the flow dividing valve 42. The valve opening degree detection sensor 85 is provided near the inlet valve 35. The valve opening degree detection sensor 86 is provided near the cathode pressure control valve 46. The valve opening degree detection sensors 82, 85, 86 detect the opening degrees of the flow dividing valve 42, the inlet valve 35, and the cathode pressure control valve 46, respectively.

Other than a driving motor of the fuel cell vehicle, the loads 100 may include auxiliaries, such as the compressor 33 and the hydrogen pump 64, and vehicle accessories, such as an air conditioning device (air conditioner) provided in the fuel cell vehicle. The loads 100 are supplied with electricity from the fuel cell 20 or the secondary battery 80, or from both the fuel cell 20 and the secondary battery 80 at the same time, through an inverter (not shown).

The control unit 90 is a microcomputer including a central processing unit (CPU) and a main storage device, and is configured as an electronic control unit. Detection signals from a sensor group (not shown) of the fuel cell vehicle including an accelerator position sensor and a vehicle speed sensor, in addition to various sensors including the cathode pressure sensor 34, the tank pressure sensor 53, and the anode pressure sensor 57, are input into the control unit 90. The control unit 90 controls parts involved in power generation of the fuel cell 20, including various valves such as the inlet valve 35, the flow dividing valve 42, the cathode pressure control valve 46, the main stop valve 54, the anode pressure control valve 55, the injector 56, and the vent and drain valve 65, and auxiliaries such as the compressor 33 and the hydrogen pump 64, by outputting driving signals to those parts. The control unit 90 controls power generation in the fuel cell system 10 by executing a control program stored in the main storage device.

The control unit 90 controls the operation of the valves 35, 42, 46 by controlling the valve driving motors 35a, 42a, 46a, respectively. The control unit 90 detects an abnormality of each of the valves 35, 42, 46 by using detected opening degrees that are opening degrees of the valves 35, 42, 46 detected by the valve opening degree detection sensors 85, 82, 86. Specifically, for example, the control unit 90 controls the valve driving motor 35a by sending an opening degree signal to the valve driving motor 35a. The control unit 90 detects an abnormality of the inlet valve 35 when an opening degree difference between the opening degree indicated by the sent opening degree signal and the detected opening degree that is the opening degree of the inlet valve 35 is not smaller than a predetermined opening degree difference.

When an abnormality of one of the inlet valve 35, the flow dividing valve 42, and the cathode pressure control valve 46 is detected, the control unit 90 sends a command to the valve driving motor of the valve of which the abnormality has been detected. Such commands include an opening command, a closing command, and a maintaining command. The opening command is a command for making the opening degree of the valve larger than the current opening degree. The closing command is a command for making the opening degree of the valve smaller than the current opening degree. The maintaining command is a command for maintaining the opening degree of the valve at the current opening degree. Details will be described later. An opening abnormality and a closing abnormality of the valves that are failure to open and failure to close, respectively, can be caused by sticking of a foreign object in a gear that moves a shaft of a valve motor, rust formation on the gear, or breakage of a gear tooth. Further, such abnormalities can occur when a foreign object enters between a shaft that supports the valve element and a part that bears a shaft part of the shaft.

The storage unit 92 stores opening degrees of valves. Further, the storage unit 92 stores measurement data from the sensors.

Figure 2:
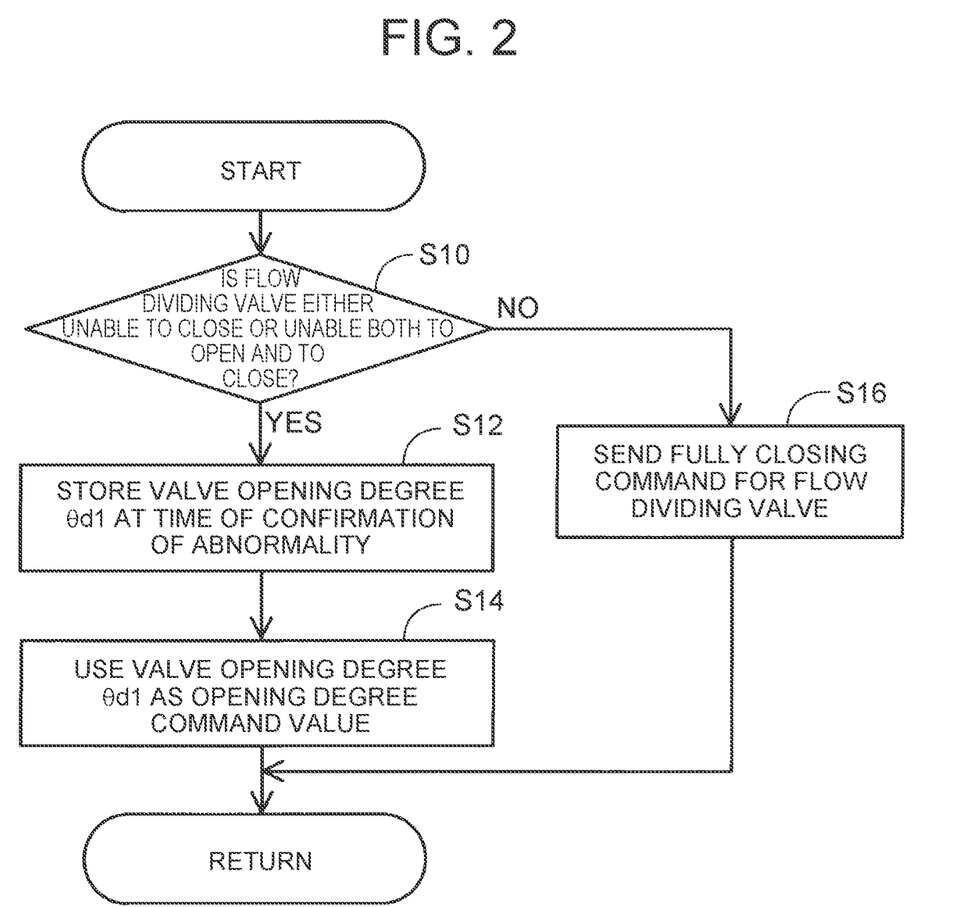
FIG. 2 is a flowchart showing the procedure of controlling the opening degree of a flow dividing valve in the event of an abnormality of the flow dividing valve.

A-2. Control of Opening Degree of Flow Dividing Valve in the Event of Abnormality Thereof FIG. 2 is a flowchart showing the procedure of controlling the opening degree of the flow dividing valve 42 in the event of an abnormality of the flow dividing valve 42. The control of the opening degree of the flow dividing valve 42 is repeatedly executed after an abnormality of the flow dividing valve 42 is detected by the control unit 90.

The control unit 90 determines whether either of the following cases applies: a case where the detected abnormality is a closing abnormality that is failure of the flow dividing valve 42 to close and the flow dividing valve 42 can open; and a case where the detected abnormality is an opening-closing abnormality that is failure of the flow dividing valve 42 both to close and to open (step S10). When it is determined that either the case where the abnormality of the flow dividing valve 42 is the closing abnormality and the flow dividing valve 42 can open or the case where the abnormality is the opening-closing abnormality that is failure both to close and to open applies (step S10: Yes), the control unit 90 stores an opening degree θd1 of the flow dividing valve 42 at that time in the storage unit 92 as the valve opening degree at the time of confirmation of abnormality (step S12). The control unit 90 sends to the valve driving motor 42a a maintaining command with the valve opening degree (valve opening degree θd1) at the time of conformation of abnormality used as the opening degree command value (step S14). As a result, the opening degree of the flow dividing valve 42 is maintained at the valve opening degree at the time of confirmation of abnormality, so that the load on the valve driving motor 42a of the flow dividing valve 42 is kept down. Thus, the load on the flow dividing valve 42 can be kept from increasing as a result of a closing command being sent despite the closing abnormality or an opening command being sent despite the opening abnormality. Further, since the opening degree is maintained, the amount of oxidation gas flowing toward the fuel cell can be kept from decreasing due to an increase in the opening degree of the flow dividing valve 42. As a result, the fuel cell 20 continues power generation.

When it is determined that neither of the case where the abnormality of the flow dividing valve 42 is the closing abnormality and the flow dividing valve 42 can open and the case where the abnormality is the opening-closing abnormality that is failure both to close and to open applies (step S10: No), the control unit 90 sends to the valve driving motor 42a a command for adjusting the valve opening degree of the flow dividing valve 42 so as to fully close the flow dividing valve 42 (hereinafter referred to as a "fully closing command") (step S16). The fully closing command is a command for adjusting the valve opening degree to a minimum opening degree. In the flow dividing valve 42, an abnormality that is neither the closing abnormality of failing to close while being able to open nor the opening-closing abnormality of failing both to close and to open means an abnormality of failing to open while being able to close. In the case of such an abnormality of failing to open while being able to close, a command for adjusting the valve opening degree of the flow dividing valve 42 so as to fully close the flow dividing valve 42 is sent in step S16, so that the load on the valve driving motor 42*a* is kept from increasing. Thus, the load on the flow dividing valve 42 can be kept from increasing due to an opening command being sent despite the abnormality of failing to open. Further, sending the fully closing command to the valve driving motor 42*a* can increase the amount of oxidation gas flowing toward the fuel cell 20. As a result, the fuel cell 20 continues power generation.

Figure 3:
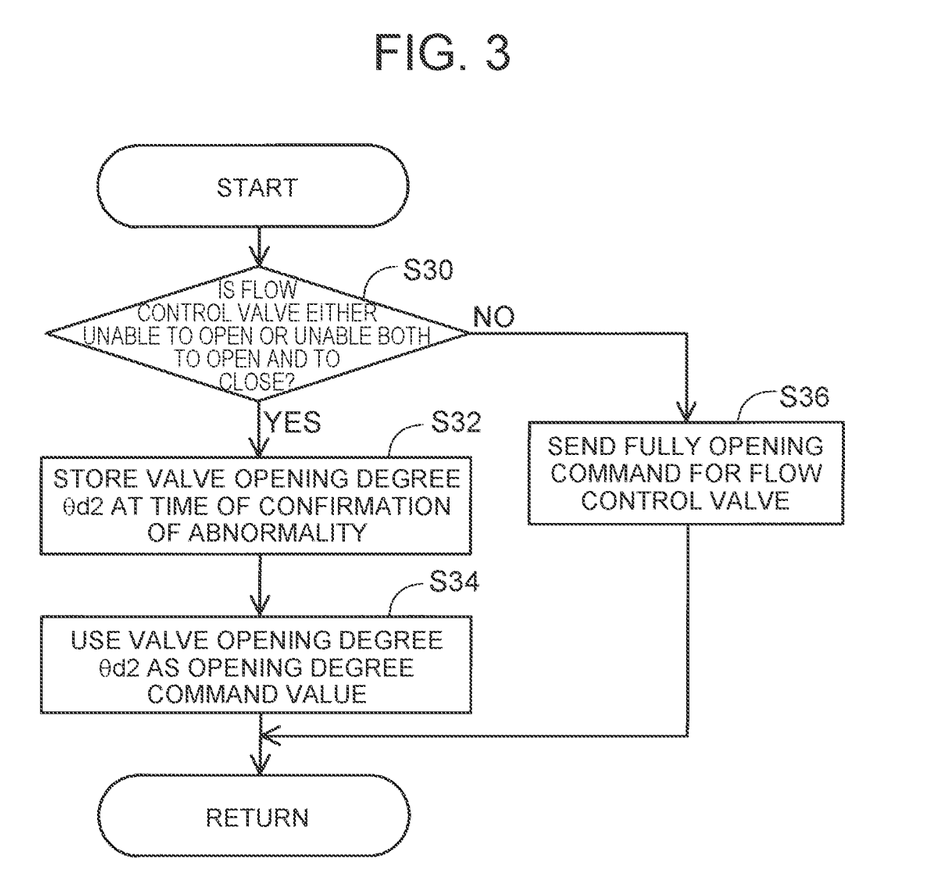
FIG. 3 is a flowchart showing the procedure of controlling the opening degree of a flow control valve in the event of an abnormality of the flow control valve.

A-3. Control of Opening Degree of Flow Control Valve in the Event of Abnormality Thereof FIG. 3 is a flowchart showing the procedure of controlling the opening degree of the flow control valve 36 when the flow control valve 36 has an abnormality. The control of the opening degree of the flow control valve 36 is repeatedly executed after an abnormality of the flow control valve 36 is detected by the control unit 90. The abnormality of the flow control valve 36 refers to an abnormality of at least one of the inlet valve 35 and the cathode pressure control valve 46 constituting the flow control valves 36.

The control unit 90 determines whether either of the following cases applies: a case where the detected abnormality is an opening abnormality that is failure of the flow control valve 36 to open and the flow control valve 36 can close; and a case where the detected abnormality is an opening-closing abnormality that is failure of the flow control valve 36 both to open and to close (step S30). When it is determined that either the case where the abnormality of the flow control valve 36 is the opening abnormality and the flow control valve 36 can close or the case where the abnormality of the flow control valve 36 is the opening-closing abnormality that is failure both to open and to close applies (step S30: Yes), the control unit 90 stores an opening degree θd2 of the flow control valve 36 at that time in the storage unit 92 as the valve opening degree at the time of confirmation of abnormality (step S32). The control unit 90 sends to the valve driving motor a maintaining command with the valve opening degree θd2 of the flow control valve 36 used as the opening degree command value (step S34). As a result, the opening degree of the flow control valve 36 is maintained at the valve opening degree at the time of confirmation of abnormality, so that the load on the valve driving motor of the flow control valve 36 is kept from increasing. Thus, the load on the flow control valve 36 can be kept from increasing due to an opening command being sent despite the opening abnormality or a closing command being sent despite the closing abnormality. Further, since the opening degree is maintained, the amount of oxidation gas flowing toward the fuel cell 20 can be kept from decreasing. As a result, the fuel cell 20 continues power generation. In step S32 and step S34, the processes of the step S32 and step S34 are performed only one of the flow control valves 36 of which the abnormality has been detected. To the valve driving motor of the normal valve, the same opening degree command as at normal times is sent.

When it is determined that neither of the case where the abnormality of the flow control valve 36 is the opening abnormality and the flow control valve 36 can close and the case where the abnormality is the opening-closing abnormality that is failure both to open and to close applies (step S30: No), the control unit 90 sends to the valve driving motor a command for adjusting the valve opening degree of the flow control valve 36 so as to fully open the flow control valve 36 (step S36). In step S36, as in step S32 and step S34, the command for adjusting the valve opening degree so as to fully open the valve is sent to the valve driving motor of one of the flow control valves 36 that has the abnormality. For example, when one of the flow control valves 36 that has an abnormality is the inlet valve 35, the command for adjusting the valve opening degree so as to fully open the valve is sent to the valve driving motor 35*a*, while the same opening degree command as at normal times is sent to the valve driving motor 46*a* of the other valve, the cathode pressure control valve 46. The fully opening command is a command for adjusting the opening degree of the valve to a maximum opening degree.

In the flow control valve 36, an abnormality that is neither the opening abnormality of failing to open nor the opening-closing abnormality of failing both to close and to open means an abnormality of failing to close while being able to open. In the case of such an abnormality of failing to close while being able to open, a command for adjusting the valve opening degree of the flow control valve 36 so as to fully open the flow control valve 36 is sent in step S36, so that the load on the valve driving motor is kept down. Thus, the load on the flow control valve 36 can be kept from increasing due to a closing command being sent despite the closing abnormality of failing to close. Further, since the fully opening command is sent to the flow control valve 36, the amount of oxidation gas flowing toward the fuel cell 20 or the amount of oxidation off-gas discharged from the fuel cell is adjusted so as to increase. As a result, the fuel cell 20 continues power generation.

In the fuel cell system 10 of the embodiment having been described above, when the abnormality of the flow dividing valve 42 is the opening abnormality and the flow dividing valve 42 can close, the control unit 90 sends the fully closing command for adjusting the opening degree to the minimum opening degree to the valve driving motor 42*a*. Thus, the oxidation gas flowing toward the bypass channel 41 can be reduced while the flow rate of the oxidation gas flowing toward the fuel cell 20 can be increased to allow the fuel cell 20 to continue power generation. Further, the load on the valve driving motor 42*a* can be kept from increasing due to a command to open being sent to the valve driving motor 42*a* despite the opening abnormality.

When the abnormality of the flow dividing valve 42 is the closing abnormality that is failure to close and the flow dividing valve 42 can open, the control unit 90 sends the maintaining command for maintaining the opening degree to the valve driving motor 42*a*. Thus, the flow rate of the oxidation gas flowing toward the fuel cell 20 can be kept from decreasing to allow the fuel cell 20 to continue power generation. Further, the load on the valve driving motor 42*a* can be kept from increasing due to a command to close being sent to the valve driving motor 42*a* despite the closing abnormality.

When the abnormality of the flow dividing valve 42 is the opening-closing abnormality that is failure both to close and to open, the control unit 90 sends the maintaining command for maintaining the opening degree to the valve driving motor 42*a*. Thus, the flow rate of the oxidation gas flowing toward the fuel cell 20 can be kept from decreasing to allow the fuel cell 20 to continue power generation. Further, the load on the valve driving motor 42a can be kept from increasing due to a command to close or a command to open being sent to the valve driving motor 42a despite the opening-closing abnormality. In this way, the fuel cell system of this form allows the fuel cell 20 to continue power generation in the event of an abnormality of the flow dividing valve 42 while keeping the load on the valve driving motor 42a down.

When the abnormality of the flow control valve 36 is the closing abnormality and the flow control valve 36 can open, the control unit 90 sends the fully opening command for adjusting the opening degree to the maximum opening degree to the valve driving motor of the flow control valve 36. Thus, the flow rate of the oxidation gas flowing toward the fuel cell 20 can be increased to allow the fuel cell 20 to continue power generation. Further, the load on the valve driving motor can be kept from increasing due to a command to close being sent to the valve driving motor despite the closing abnormality.

When the abnormality of the flow control valve 36 is the opening abnormality and the flow control valve 36 can close, the control unit 90 sends the maintaining command for maintaining the opening degree to the valve driving motor of the flow control valve 36. Thus, the flow rate of the oxidation gas flowing toward the fuel cell 20 can be kept from decreasing to allow the fuel cell 20 to continue power generation. Further, the load on the valve driving motor can be kept from increasing due to a command to open being sent to the valve driving motor despite the opening abnormality.

When the abnormality of the flow control valve 36 is the opening-closing abnormality that is failure both to open and to close, the control unit 90 sends the maintaining command for maintaining the opening degree to the valve driving motor of the flow control valve 36. Thus, the flow rate of the oxidation gas flowing toward the fuel cell 20 can be kept from decreasing to allow the fuel cell 20 to continue power generation. Further, the load on the valve driving motor can be kept from increasing due to a command to close or a command to open being sent to the valve driving motor despite the opening-closing abnormality. In this way, the fuel cell system of this form allows the fuel cell 20 to continue power generation in the event of an abnormality of the flow control valve 36 while keeping the load on the valve driving motor down.

B. Other Embodiments (B1) In the fuel cell system 10 of the embodiment, the bypass channel 41 and the flow dividing valve 42 may be omitted. Also in this configuration, executing the control of the opening degree of the flow control valve 36 shown in FIG. 3 on the flow control valve 36 produces effects similar to those of the above embodiment. Further, in the fuel cell system 10 of the embodiment, at least one of the inlet valve 35 and the cathode pressure control valve 46 may be omitted. Also in this configuration, executing the control of the opening degree of the flow dividing valve 42 shown in FIG. 2 on the flow dividing valve 42 produces effects similar to those of the embodiment. In the configuration in which only one of the inlet valve 35 and the cathode pressure control valve 46 is provided, executing the control of the opening degree of the flow dividing valve 42 shown in FIG. 2 on the flow dividing valve 42 and executing the control of the opening degree of the flow control valve 36 shown in FIG. 3 on one of the flow control valves 36 that is provided produces effects similar to those of the embodiment.

(B2) In the fuel cell system 10 of the embodiment, the valve opening degree control process in the event of an abnormality need not be executed on one or more of the three valves. Executing the control of the opening degree on the other valves produces effects similar to those of the embodiment.

(B3) In the control of the opening degree of the flow dividing valve 42 in the event of an abnormality of the flow dividing valve 42 in the embodiment, before the process of step S10 is executed, a process for determining whether the flow dividing valve 42 can open and a process for determining whether the flow dividing valve 42 can close may be additionally executed. Similarly, in the control of the opening degree of the flow control valve 36 in the event of an abnormality of the flow control valve 36 in the embodiment, before the process of step S30 is executed, a process for determining whether the flow control valve 36 can open and a process for determining whether the flow control valve 36 can close may be additionally executed.

(B4) In the control of the opening degree of the flow dividing valve 42 in the event of an abnormality of the flow dividing valve 42 in the embodiment, the fully closing command is sent to the flow dividing valve 42 as the process of step S16, but instead a command for closing the flow dividing valve 42 by an arbitrary opening degree from the current opening degree may be sent. Further, in the control of the opening degree of the flow control valve 36 in the event of an abnormality of the flow control valve 36 in the embodiment, the fully opening command is sent as the process of step S36, but instead a command for opening the flow control valve 36 by an arbitrary opening degree from the current opening degree may be sent.

(B5) In the control of the opening degree of the flow control valve 36 in the event of an abnormality of the flow control valve 36 in the embodiment, the process shown in FIG. 3 is performed only on one of the flow control valves 36 of which an abnormality has been detected, while the same opening degree command as at normal times is sent to the valve driving motor of the normal valve. However, this disclosure is not limited to this example. The opening degree of the normal valve may be adjusted to a predetermined opening degree according to the state of the fuel cell 20. For example, when an abnormality of the inlet valve 35 is detected, the opening degree of the other valve, the cathode pressure control valve 46, may be adjusted to a predetermined opening degree.

This disclosure is not limited to the above-described embodiment but can be realized in various configurations within a scope that does not depart from the gist of the disclosure. For example, to solve part or the whole of the above-described problem or to achieve some or all of the above-described effects, the technical features of the embodiment corresponding to the technical features in the forms described in the section SUMMARY can be substituted or combined as appropriate. In addition, any technical features that are not described as essential in the specification can be omitted as appropriate.

What is claimed is:
1. A fuel cell system comprising:
a fuel cell;
an oxidation gas supply channel through which an oxidation gas is supplied to the fuel cell;
an oxidation off-gas discharge channel through which an oxidation off-gas is discharged from the fuel cell;

a bypass channel that connects the oxidation gas supply channel and the oxidation off-gas discharge channel to each other;

a flow dividing valve that is provided in the bypass channel to divide a flow of the oxidation gas flowing through the oxidation gas supply channel into a flow toward the fuel cell and a flow toward the bypass channel;

a valve driving motor that adjusts an opening degree of the flow dividing valve;

a valve opening degree detection sensor that detects the opening degree of the flow dividing valve; and a control unit configured to control operation of the flow dividing valve by controlling the valve driving motor, and to detect a detected abnormality of the flow dividing valve using a detected opening degree that is the opening degree of the flow dividing valve detected by the valve opening degree detection sensor, wherein the control unit is configured such that:

when the detected abnormality is an opening abnormality that is failure to open and the flow dividing valve is able to close, the control unit sends a closing command for making the opening degree smaller than a current opening degree to the valve driving motor; and either when the detected abnormality is a closing abnormality that is failure to close and the flow dividing valve is able to open or when the detected abnormality is an opening-closing abnormality that is failure both to close and to open, the control unit sends a maintaining command for maintaining the opening degree to the valve driving motor.

2. The fuel cell system according to claim 1, wherein the control unit is configured to control the valve driving motor by sending a sent opening degree signal to the valve driving motor, and to detect the detected abnormality when an opening degree difference between an opening degree indicated by the sent opening degree signal and the detected opening degree is not smaller than a predetermined opening degree difference.

3. The fuel cell system according to claim 2, wherein the control unit is configured to, upon detecting the detected abnormality, send a predetermined opening degree signal to the valve driving motor to determine if the detected abnormality is the opening abnormality or the closing abnormality.

4. The fuel cell system according to claim 1, wherein the control unit is configured such that, when the detected abnormality is the opening abnormality and the flow dividing valve is able to close, the control unit sends, as the closing command, a command for adjusting the opening degree to a minimum opening degree to the valve driving motor.

5. A fuel cell system comprising:
a fuel cell;
an oxidation gas supply channel through which an oxidation gas is supplied to the fuel cell;
an oxidation off-gas discharge channel through which an oxidation off-gas is discharged from the fuel cell;
a flow control valve that is at least one of a first valve that is disposed in the oxidation gas supply channel and adjusts a flow of the oxidation gas and a second valve that is disposed in the oxidation off-gas discharge channel and adjusts a flow of the oxidation off-gas;
a valve driving motor that adjusts an opening degree of the flow control valve;
a valve opening degree detection sensor that detects the opening degree of the flow control valve; and
a control unit configured to control operation of the flow control valve by controlling the valve driving motor, and to detect a detected abnormality of the flow control valve using a detected opening degree that is the opening degree of the flow control valve detected by the valve opening degree detection sensor, wherein the control unit is configured such that:
when the detected abnormality is a closing abnormality that is failure to close and the flow control valve is able to open, the control unit sends an opening command for making the opening degree larger than a current opening degree to the valve driving motor; and
either when the detected abnormality is an opening abnormality that is failure to open and the flow control valve is able to close or when the detected abnormality is an opening-closing abnormality that is failure both to open and to close, the control unit sends a maintaining command for maintaining the opening degree to the valve driving motor.

6. The fuel cell system according to claim 5, wherein the control unit is configured to control the valve driving motor by sending a sent opening degree signal to the valve driving motor, and to detect the detected abnormality when an opening degree difference between an opening degree indicated by the sent opening degree signal and the detected opening degree is not smaller than a predetermined opening degree difference.

7. The fuel cell system according to claim 6, wherein the control unit is configured to, upon detecting the detected abnormality, send a predetermined opening degree signal to the valve driving motor to determine if the detected abnormality is the opening abnormality or the closing abnormality.

8. The fuel cell system according to claim 5, wherein the control unit is configured such that, when the detected abnormality is the closing abnormality and the flow control valve is able to open, the control unit sends, as the opening command, a command for adjusting the opening degree to a maximum opening degree to the valve driving motor.

* * * * *